United States Patent [19]

Melone

[11] 4,034,788
[45] July 12, 1977

[54] FASTENER ASSEMBLY

[75] Inventor: Robert R. Melone, Rockford, Ill.

[73] Assignee: Elco Industries, Inc., Rockford, Ill.

[21] Appl. No.: 642,351

[22] Filed: Dec. 19, 1975

[51] Int. Cl.² .................... F16B 39/26; F16B 39/32
[52] U.S. Cl. .................................... 151/37; 151/41
[58] Field of Search ............... 151/41, 37, 38, 35, 151/34, 40, 39

[56] References Cited

U.S. PATENT DOCUMENTS

| | | | |
|---|---|---|---|
| 1,297,845 | 3/1919 | Hawrylasz | 151/41 X |
| 2,297,957 | 10/1942 | Hanneman | 151/35 |
| 2,675,844 | 4/1954 | Knohl | 151/35 |
| 2,783,810 | 3/1957 | Wrigley | 151/34 |
| 3,190,334 | 6/1965 | Wigam | 151/37 |
| 3,194,292 | 7/1965 | Borowsky | 151/35 |
| 3,241,589 | 3/1966 | Enders | 151/34 |
| 3,275,055 | 9/1966 | Gutshall | 151/41 X |
| 3,332,464 | 7/1967 | Castel | 151/35 |
| 3,352,344 | 11/1967 | Lanius | 151/35 |
| 3,438,416 | 4/1969 | Thurston | 151/41 X |

*Primary Examiner*—Ramon S. Britts
*Attorney, Agent, or Firm*—Leydig, Voit, Osann, Mayer & Holt, Ltd.

[57] ABSTRACT

A fastener assembly for use in securing one member to another includes a bolt and a washer telescoped onto the bolt. The washer is formed with a central protruding section and an integral annular flange extending radially outward from the base of the protruding section. A frustoconical recess formed within the underside of the washer is smaller in diameter than the diameter of the protruding section. Mating ratchet teeth formed on the underside of the bolt head and the protruding section interfit so as to enable the bolt to be turned relative to the washer during tightening while keeping the bolt from turning in a loosening direction once the bolt is tightened down. To keep the washer from turning relative to the members secured together by the bolt, angularly spaced sets of two locking teeth are formed within the flange and extend axially therefrom to embed in the upper surface of the top member. The teeth in each set face each other so that one tooth locks the washer against turning in a tightening direction and the other tooth locks the washer against turning in a loosening direction. The locking teeth are formed at least in part by radially extending notches cut through the flange and an integral bridge section extends between the teeth in each set to keep the teeth from being bent axially upward as the bolt is tightened down.

9 Claims, 9 Drawing Figures

FASTENER ASSEMBLY

BACKGROUND OF THE INVENTION

The present invention relates to a fastener assembly and, more particularly, to a fastener assembly of the type including a bolt and a washer combination adapted for use in securing one member to another in an environment where the bolt and washer are subjected to vibration and wide-range temperature variations which tend to cause the tightened assembly to loosen. Typically, the fastener assembly may be used in securing the exhaust manifold of a combustion engine to the engine block. Examples of fastener systems designed for use in environments of this nature are disclosed in U.S. Pat. Nos. 3,275,055 and 3,352,344. Another fastener system which might be considered to be relevent to the invention claimed herein is disclosed in U.S. Pat. No. 2,297,957.

In an environment of the foregoing nature it is desirable to achieve a high bolt load to tightening torque ratio so that as much as possible of the torque applied to the bolt in securing it to the engine block is converted into bolt load, that is, the axially directed, internal force of the bolt which holds the manifold on the block. Also, it is desirable to achieve consistency in the bolt load from one bolt to the next when several fastener assemblies are tightened to the same torque in securing the manifold to the engine block. Moreover, it is desirable that the breakaway torque, or torque required to loosen a tightened bolt in the block, be as high as possible in relation to the tightening torque and that the bolt and washer assembly be constructed so that, even with annealing of the bolt and washer due to heat in the manifold, the breakaway torque remains high to keep the assembly from being loosened easily.

SUMMARY OF THE INVENTION

The primary object of the present invention is to provide a new and improved fastener assembly of the foregoing general character which in service use consistently achieves a high bolt load to torque ratio from one assembly to the next while still providing a fastener assembly with a high breakaway torque. A more detailed object is to achieve the foregoing in a fastener assembly which even after being annealed continues to maintain a high bolt load so as to keep from being loosened easily by vibration.

Still further, it is an object of the present invention to construct the fastener assembly in a novel fashion so that it is markedly easier to tighten down the bolt to a high bolt load.

The invention also resides in the novel construction of peripheral locking teeth on the washer to resist being bent relative to the washer upon embedding in the manifold as the bolt is tightened down.

Still further, the invention resides in the provision of circumferentially spaced pairs or sets of the locking teeth, one tooth of each set being adapted to lock the washer against turning in one direction with respect to the manifold and the other tooth being adapted to lock the washer against turning in the other direction. Advantageously, a unique supportive bridge integrally formed with the washer between the locking teeth in each pair aids in keeping the teeth from being bent substantially relative to the washer when tightening down the bolt.

These and other objects and advantages of the present invention will become more apparent from the following detailed description when taken in conjunction with the accompanying drawings.

DETAILED DESCRIPTION OF THE PREFERRED EMBODIMENT

Figure 1:
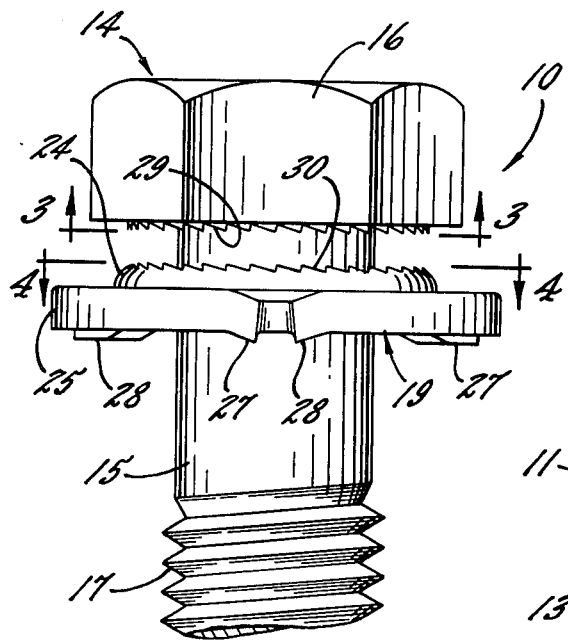
FIG. 1 is a fragmentary elevational view of a fastener assembly embodying the novel features of the present invention.
Figure 2:
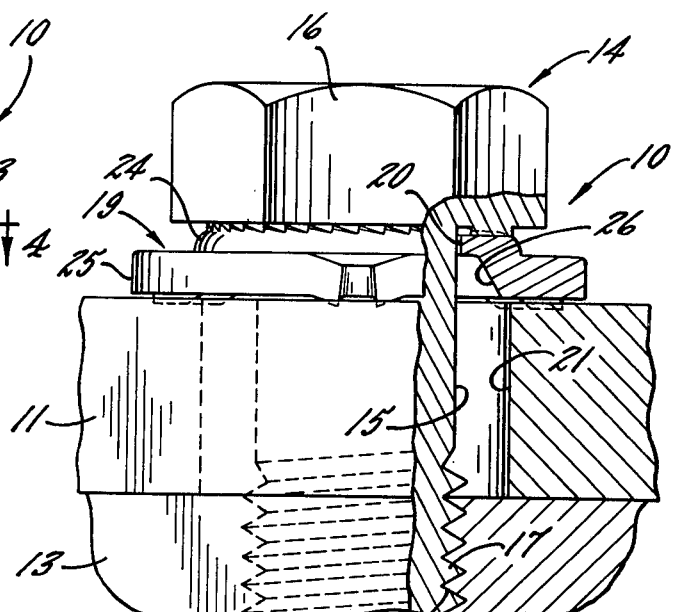
FIG. 2 is an elevational view showing the fastener assembly holding together two members, parts of the assembly being broken away and shown in cross section.

As shown in the drawings for purposes of illustration, the present invention is embodied in a fastener assembly 10 suitable for use in securing together two members such as manifold 11 to an engine block 13. Herein, the assembly comprises a bolt 14 having an elongated shank 15 with an enlarged head 16 integrally formed with the upper end thereof and a threaded section 17 rolled within the lower end portion. A generally circular washer 19 with a central aperture defined by an interior wall 20 is captivated on the shank between the underside of the bolt head and the threaded section. In use, the bolt is telescoped through an opening 21 in the manifold and is turned into a threaded section 23 of the engine block to tighten the manifold against the block. Typically, the opening 21 in the manifold is substantially larger in diameter than the shank so that the reactive force of the manifold is applied to the periphery of the washer while the bolt load is applied through the head to the central portion 24 of the washer. This application of forces tends to cause the washer to dish inwardly in service use particularly after the washer has lost strength due to annealing caused by high operating temperature of the manifold. In turn, the dishing reduces bolt load so that vibration may cause the bolt to loosen within the engine block.

In carrying out one aspect of the present invention, the washer 19 is constructed in a unique fashion so as to reduce dishing and thereby maintain adequately high bolt load within the assembly even after being annealed. For this purpose, the washer is formed with its central portion 24 protruding upwardly from an annular flange section 25 and having a predetermined diameter. A frustoconical recess 26 is formed within the underside of the washer and has a base diameter smaller than the predetermined diameter of the protruding portion 24. By virtue of this construction, the washer is kept from dishing substantially even after being annealed so that adequately high bolt load is maintained without a substantial increase in the amount of the material from which the washer is made.

In addition to avoiding dishing of the washer 19, it also is desirable that a reasonably high percentage of the useful torque applied in tightening the bolt 14 in the engine block 13 be converted into bolt load. In other words, it is desirable to achieve a high bolt load to torque ratio and to do so consistently so that the load created in bolts tightened to the same torque within an engine block is about the same from one bolt to the next. Further, to avoid loosening of the bolt, even when tightened to a high load and after annealing, it is desirable that the breakaway torque, or the torque required for initially turning the bolt in a loosening direction, be as great as possible relative to the tightening torque.

In accordance with the primary aspect of the present invention, the fastener assembly 10 includes means permitting relative rotation between the bolt 14 and washer 19 in a tightening direction but not in a loosening direction and sets of locking teeth 27 and 28 are integrally formed with the washer so that the teeth become embedded within the manifold or upper member 11 to keep the washer from turning relative to the bolt both in the tightening direction during tightening and in the loosening direction after tightening. For these purposes, the foregoing means includes mating ratchet teeth 29 and 30 formed within the bolt head 16 and protruding washer section 24 and the sets of locking teeth include opposing faces 31 and 33 with lower edges 34 and 35 for embedding within the member, one of the teeth in each set keeping the washer from turning relative to the member in one direction and the other of the teeth keeping the washer from turning in the other direction. Advantageously with this construction of the fastener assembly a high bolt load to torque ratio may be achieved easily and consistently while also providing a tightened assembly with a high breakaway torque.

Figure 3:
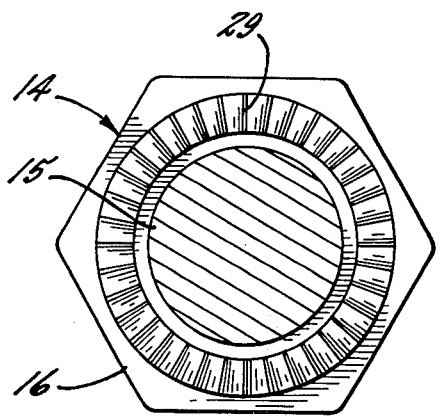
FIGS. 3 and 4 are views taken substantially along lines 3—3 and 4—4 of FIG. 1, respectively.
Figure 5:
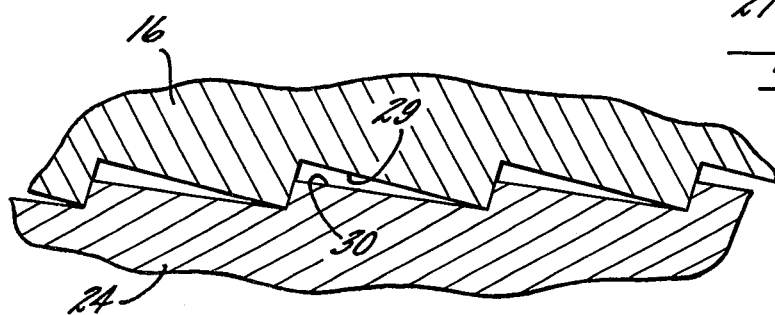
FIG. 5 is enlarged cross-sectional view showing mating parts of the washer and bolt of the exemplary fastener assembly.

In the present instance, the ratchet teeth 29 are integrally formed concentrically with the axis of the shank 15 in the underside of the bolt head 16 and extend downwardly therefrom in a generally axial direction relative to the shank of the bolt with the lower edges of the teeth extending radially relative to the axis of the shank (see FIG. 3). The ratchet teeth 30 in the washer 19 are formed in a similar fashion but extend upwardly from the protruding central section 24 to mate with the ratchet teeth 29. Herein, the ratchet teeth are shaped so as to permit controlled sliding between the bolt head and washer during tightening of the bolt but keep the bolt from being turned easily in a loosening direction relative to the washer once the bolt is tightened down. By virtue of maintaining the controlled sliding between the bolt and washer on the smooth surfaces of the ratchet teeth and with the locking teeth 27 and 28 holding the washer against turning relative to the manifold 11, a relatively consistent and high percentage of the useful torque applied in tightening the bolt is converted into bolt load rather than being affected by variable frictional forces between the washer and the manifold if the washer were to turn relative to the manifold. Preferably, to aid in keeping the sliding controlled and consistent between the ratchet teeth 29 and 30 (see FIG. 5) the height of the ratchet teeth 30 is slightly greater than one-half the height of the ratchet teeth 29.

Figure 4:
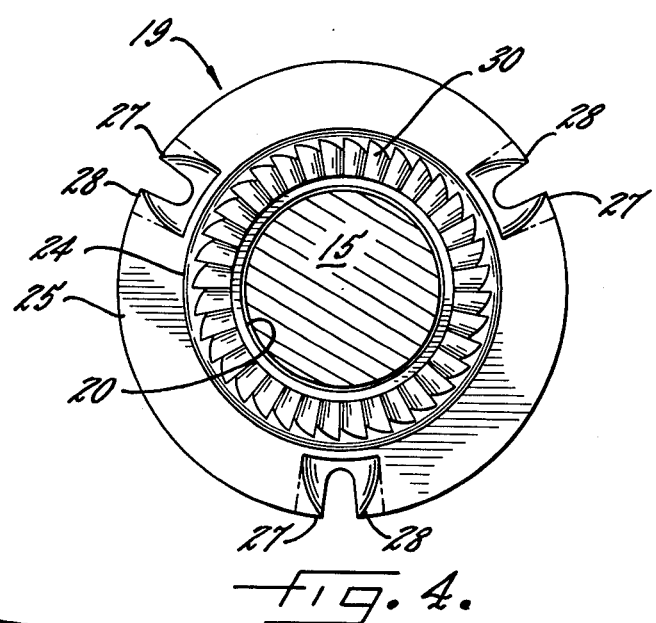
Figure 7:
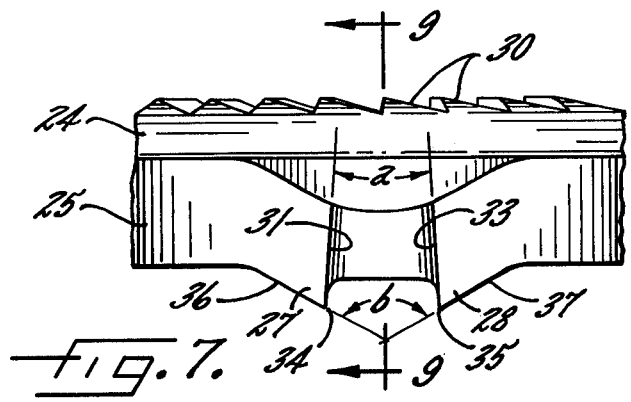
FIG. 7 is an elevational view of the portion of the washer shown in FIG. 6.
Figure 9:
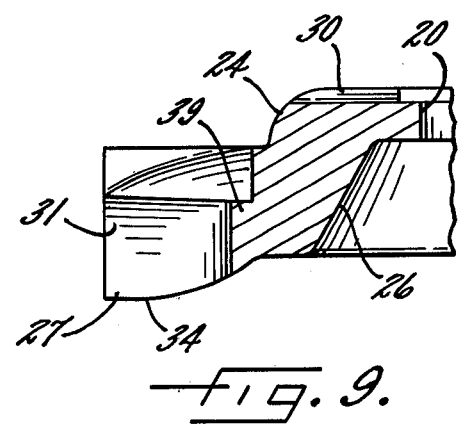
FIG. 9 is a view taken substantially along line 9—9 of FIG. 7.

As shown in FIGS. 1 and 4, the exemplary fastener assembly 10 includes three sets of locking teeth 27 and 28 protruding axially downward from the underside of the washer flange 25. Herein, the opposing faces 31 and 33 in each set of locking teeth 27 and 28 define the opposite sides of a generally U-shaped notch formed through the flange and extending radially inward from the periphery of the flange, the notch terminating within the flange before entering the protruding section 24 of the washer 19. More particularly, the opposing faces converge toward each other at an acute included angle $a$ (see FIG. 7) upon progressing axially upward from the underside of the flange. Trailing walls 36 and 37 of the teeth 27 and 28 intersect with the faces 31 and 33 to define the lower edges 34 and 35, respectively, and the walls diverge from each other at an obtuse included angle $b$ upon progressing in an axially upward direction from the lower edges.

Figure 6:
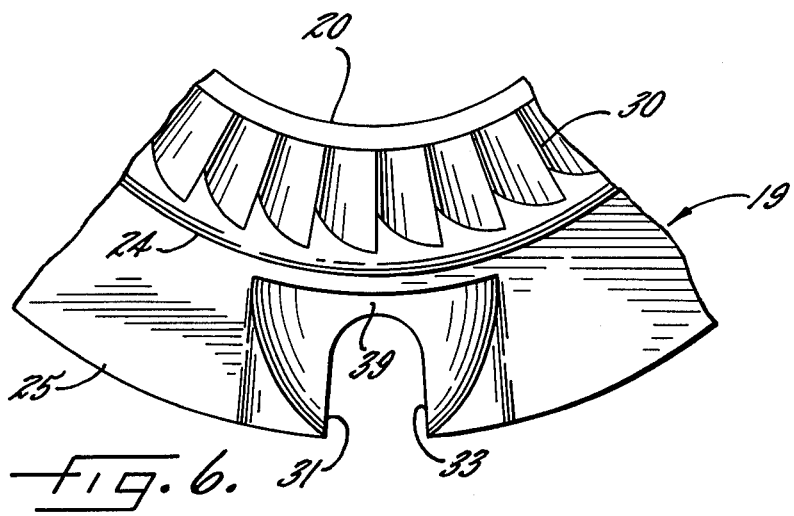
FIG. 6 is an enlarged, fragmentary plan view of a portion of the washer.
Figure 8:
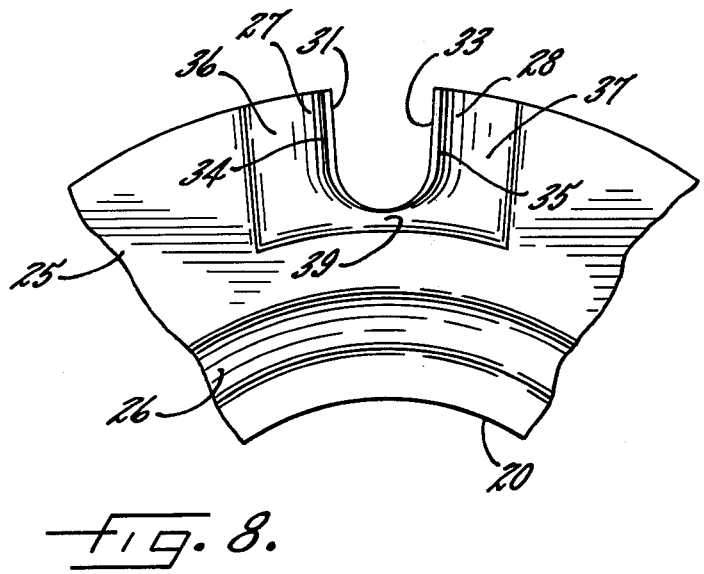
FIG. 8 is a view similar to FIG. 6 but showing the underside of the portion of the washer.

Preferably, the teeth 27 and 28 are made by deforming the material of the washer 19 adjacent the notch with the material in the upper side of the flange 25 being depressed in a generally bell-shaped configuration (see FIGS. 6 and 7) and the material in the underside of the flange extended in a generally rectangular configuration (see FIG. 8). Advantageously, the material is deformed in the flange inwardly beyond the inner end of the notch so the material adjacent the inner end of the notch forms a bridge section 39 extending in a generally circumferential direction between the opposing faces 31 and 33 of the locking teeth 27 and 28. The bridge serves to aid in supporting the two teeth against being bent upwardly relative to the flange 25 as they are embedded in the manifold. In this way, the teeth are assured of locking the washer against turning relative to the manifold 11 both in the tightening direction as the bolt 14 is being tightened down and in the loosening direction after the bolt is tightened down.

In view of the foregoing, it will be appreciated that the present invention brings to the art a new and improved fastener assembly 10 particularly adapted for use in securing the manifold 11 of an engine to the engine block 13, the fastener assembly holding more securely even after being annealed while also providing the desirably high bolt load to torque ratio which remains substantially consistent from one tightened assembly to the next. Advantageously, the interfitting ratchet teeth 29 and 30 in the bolt head 16 and the washer 19 permit turning of the bolt 14 relative to the washer in the tightening direction while the locking teeth 33 hold the washer against turning, the locking teeth 31 holding the washer against turning relative to the manifold in the loosening direction so that, once tightened down, the assembly is locked together, making it highly resistant to loosening forces.

In the appended claims, the terms "upper," "lower," "upward" and "downwardly" have been used for purposes of simplification and apply when the washer is oriented as shown in FIG. 1. It will be appreciated, however, that the washer can be positioned in other orientations and that those terms in the claims indicating direction or orientation in a vertical sense should be considered as establishing a datum reference which is applicable when any particular washer is oriented in the same fashion as shown in FIG. 1.

I claim:

1. A fastener assembly for use in conjunction with a threaded section of a first member to secure the first member to a second member, said assembly comprising, a threaded element rotatable about an axis to mate with the threaded section for fastening the members together, a washer adapted to fit between said element and the second member, said washer having a central opening and having upper and lower surfaces, angularly spaced sets of first and second locking teeth integrally formed with said washer adjacent the outer periphery thereof and projecting substantially downwardly from the lower surface of said washer for embedding in the second member, the teeth of each of said sets being relatively close to each other and each set being spaced a substantial distance from the adjacent sets, the first teeth of each set facing in one substantially circumferential direction to keep said washer from turning in a tightening direction as said element is tightened down, the second teeth of each set facing the opposite substantially circumferential direction to keep said washer from turning in a loosening direction after said element is tightened down, the teeth of each set being located at opposite edges of a substantially U-shaped notch formed through and extending substantially radially of said washer and opening out of the outer periphery thereof, and a continuous bridge section displaced downwardly throughout the extent thereof from the upper and lower surfaces of said washer and extending around the closed end of each notch and between said first and second teeth in each set of said teeth to support the latter against substantial upward bending as said element is tightened down.

2. A fastener assembly as defined by claim 1 wherein said first and second locking teeth include opposing, radially extending first and second faces, respectively, defining the opposite sides of the intervening notch, said faces converging toward each other at an acute included angle upon progressing axially upward from the lower surface of said washer, first and second trailing walls intersecting with said first and second faces, respectively, and diverging from each other at an obtuse included angle upon progressing in an axial direction upwardly from said intersection, and first and second generally radial edges being defined by the intersections of said faces with said trailing walls.

3. A fastener assemby as defined n claim 1 in which said washer includes an upwardly protruding central section of predetermined diameter for engagement with the lower side of said element, a substantially continuous interior wall formed within said protruding section and defining said central opening through said washer, an annular flange section formed integrally with the lower base of said protruding section and extending outwardly therefrom in a generally radial direction, said notches being formed through said flange, and an annular recess in the lower surface of said washer and having a maximum diameter less than said predetermined diameter of said protruding section.

4. A fastener assemby as defined by claim 3 wherein said annular recess is of a generally frustoconical shape having a base diameter less than said predetermined diameter of said protruding section.

5. A fastener assembly as defined in claim 1 further including a first series of generally circumferentially facing ratchet teeth formed integrally with the lower side of said element and spaced angularly from one another around the axis of said element, and a second series of generally circumferentially facing ratchet teeth formed integrally with the upper surface of said washer to interfit with said first series of ratchet teeth so as to enable said element to be rotated in a tightening direction relative to said washer and to hold said element against turning relative to said washer in a loosening direction once said element is tightened down.

6. A fastener assembly as defined by claim 5 wherein said ratchet teeth in one of said series are of a height less than the height of said ratchet teeth in the other of said series.

7. A fastener assembly as defined by claim 6 wherein said ratchet teeth in said second series are of a height greater than one-half the height of said ratchet teeth in said first series but less than the full height of said latter teeth.

8. A fastener assembly for use in conjunction with a threaded section of a first member to secure the first member to a second member, said assembly comprising, a threaded element rotatable about an axis to mate with the threaded section for fastening the members together, a washer adapted to fit between said element and the second member, said washer having upper and lower surfaces and including an upwardly protruding central section of a predetermined diameter for engagement with the lower side of said element, a substantially continuous interior wall formed within said washer, an annular flange section integrally formed with the base of said protruding section and extending outwardly therefrom in a generally radical direction, an annular recess formed within the lower surface of said washer and having a maximum diameter less than the predetermined diameter of said protruding section, a first series of generally radial ratchet teeth integrally formed with the lower side of said element and angularly spaced from each other around the axis of said element, a second series of radial ratchet teeth integrally formed with the upper surface of said protruding section to interfit with said first series of ratchet teeth, said ratchet teeth in said second series having a height less than the height of said ratchet teeth in said first series but greater than one-half the height of said teeth in said first series to said element may be rotated in a tightening direction relative to said washer and so as to hold said element against turning relative to said washer in a loosening direction once said element is tightened down, a plurality of angularly spaced sets of first and second locking teeth integrally formed with said flange section on the lower surface thereof and being spaced radially outward from said ratchet teeth, a generally U-shaped and radially extending notch formed through said flange section between said first and second locking teeth in each of said sets and opening out of the outer periphery of said flange section, the teeth of each of said sets being relatively close to each other and each set being spaced a substantial distance from the adjacent sets, said first and second locking teeth of each set including opposing, radially extending first and second faces, respectively, defining the opposite sides of said notch, said faces converging toward each other at an acute included angle upon progressing upwardly from the lower surface of said flange section, first and second trailing walls intersecting with said first and second faces, respectively, and diverging from each other at an obtuse included angle upon progressing upwardly from said intersections, first and second generally radial edges in said first and second teeth, respectively, defined by the intersections of said faces with said trailing walls, said edges embedding in the second member so one of said edges keeps said washer from turning in a tightening direction relative to said second member as said element is being tightened and the other of said edges keep said washer from turning in a loosening direction after said element is tightened down, and a continuous bridge section displaced downwardly throughout the extent thereof from the upper and lower surfaces of said flange section and extending in a generally circumferential direction around the closed end of each notch and between said first and second teeth in each set of teeth to support the latter against substantial upward bending as said element is tightened down.

9. A fastener assembly as defined in claim 5 in which said washer includes an upwardly protruding central section of predetermined diameter for engagement with the lower side of said element, a substantially continuous interior wall formed within said protruding section and defining said central opening through said washer, an annular flange section formed integrally with the lower base of said protruding section and extending outwardly therefrom in a generally radial direction, said notches being formed through said flange and said second series of ratchet teeth being formed on the upper surface of said protruding section, and an annular recess in the lower surface of said washer and having a maximum diameter less than said predetermined diameter of said protruding section.

* * * * *